(12) United States Patent
Trausch et al.

(10) Patent No.: US 9,712,898 B2
(45) Date of Patent: Jul. 18, 2017

(54) NETWORK AGGREGATION IN A COMPUTING SHELF/TRAY

(71) Applicant: Intel Corporation, Santa Clara, CA (US)

(72) Inventors: Terrence Trausch, Hillsboro, OR (US); Gabriel C. Cox, Hillsboro, OR (US); James T. Langston, Jr., Hillsboro, OR (US); Guy L. Williams, Yamhill, OR (US)

(73) Assignee: Intel Corporation, Santa Clara, CA (US)

( * ) Notice: Subject to any disclaimer, the term of this patent is extended or adjusted under 35 U.S.C. 154(b) by 506 days.

(21) Appl. No.: 14/469,243

(22) Filed: Aug. 26, 2014

(65) Prior Publication Data

US 2016/0066070 A1    Mar. 3, 2016

(51) Int. Cl.
 *G02B 6/38* (2006.01)
 *G02B 6/44* (2006.01)
 *H04Q 11/00* (2006.01)
 *H04Q 1/02* (2006.01)

(52) U.S. Cl.
 CPC .......... *H04Q 11/0003* (2013.01); *H04Q 1/09* (2013.01); *G02B 6/3897* (2013.01); *G02B 6/4452* (2013.01)

(58) Field of Classification Search
 None
 See application file for complete search history.

(56) References Cited

U.S. PATENT DOCUMENTS

| 8,702,318 B2* | 4/2014 | Isenhour | G02B 6/3849 385/60 |
| 9,500,833 B1* | 11/2016 | Xu | G02B 6/4455 |
| 2016/0192044 A1* | 6/2016 | Raza | G02B 6/3885 398/49 |
| 2016/0337727 A1* | 11/2016 | Graves | H04Q 11/0005 |

* cited by examiner

*Primary Examiner* — Hemang Sanghavi
(74) *Attorney, Agent, or Firm* — Schwabe, Williamson & Wyatt, P.C.

(57) ABSTRACT

Embodiments of the present disclosure provide arrangements for aggregating network traffic of compute nodes of various computing sleds of computing trays of a computing rack assembly in a data center. In one embodiment, a computing rack assembly may include a plurality of computing trays. A computing tray may removably include a number of sleds. Each sled may include a number of compute nodes. The computing tray may further include an optical network aggregation component to aggregate network traffic of the compute nodes of various sleds of a computing tray. Other embodiments may be described and/or claimed.

24 Claims, 5 Drawing Sheets

NETWORK AGGREGATION IN A COMPUTING SHELF/TRAY

FIELD

Embodiments of the present disclosure generally relate to data systems, and more particularly, to tray-level network aggregation of compute nodes in computing rack assemblies of data centers.

BACKGROUND

A computing data center may include one or more computing systems, each including a plurality of compute nodes that may comprise various compute structures (e.g., servers and/or storage systems) and may be physically located in multiple sleds or boards disposed on a computing shelf or computing tray of a rack. The compute nodes may be interconnected, typically via one or more switches, e.g., Network or Ethernet switches, such as a Top-of-Rack (ToR) switch, forming different compute structures.

Typically, network data traffic from compute nodes disposed in a sled may be routed by providing a separate connection for each sled in the computing tray. The sled level data traffic may then be routed to an external computing component, e.g., via a ToR switch, with discrete, fixed-bandwidth cabling. To provide desired connection efficiency, an additional local network switch (e.g., Ethernet switch) may be required. However, this solution may cause difficulties with dynamically accessing, servicing, and interconnecting different network components (e.g., compute nodes) residing in sleds of a computing tray. Further, the current solution may provide for fixed bandwidth distribution among the compute nodes in the sled, which may result in inefficient use of available compute resources.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
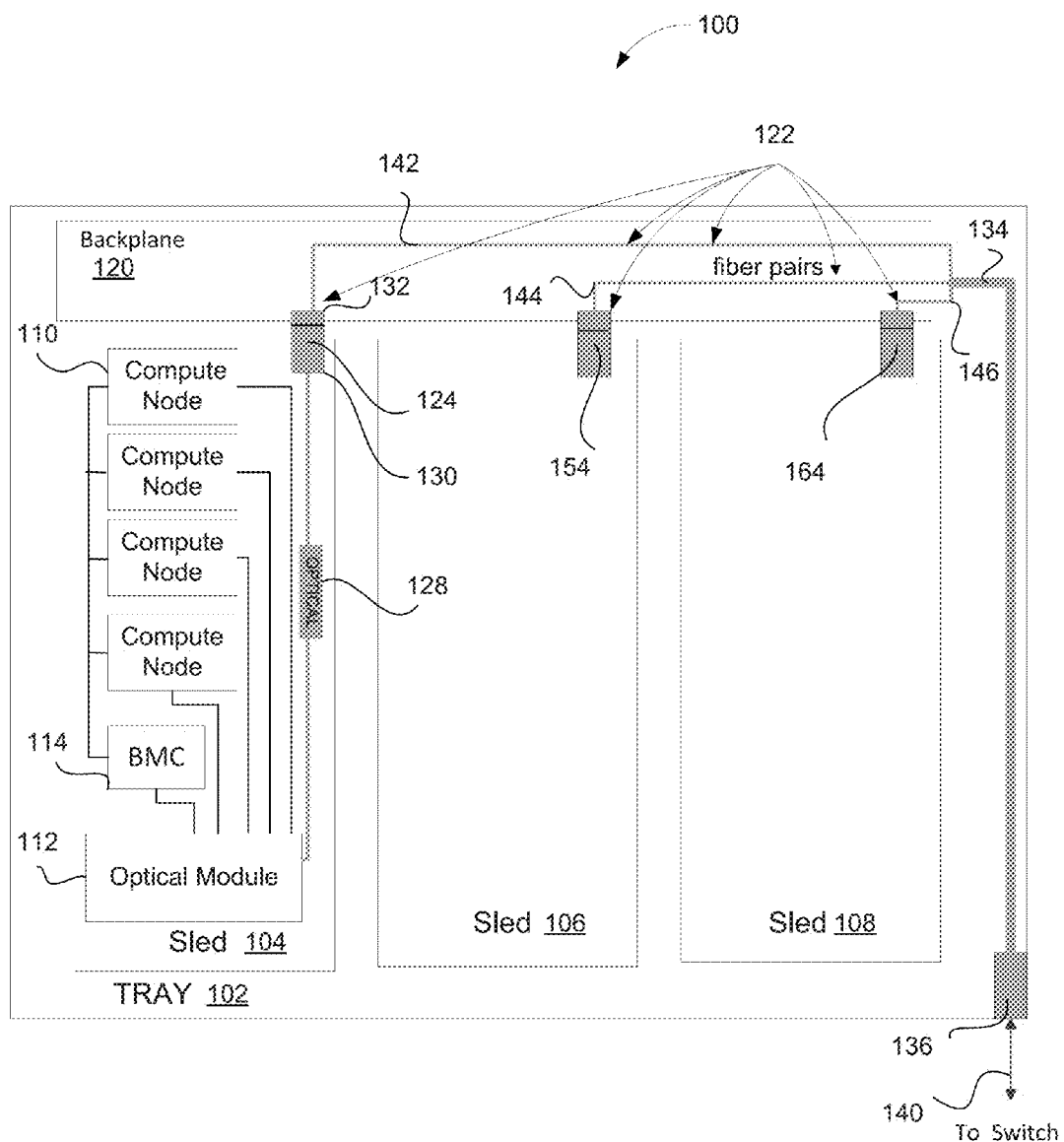
FIG. 1 schematically illustrates an example tray of a computing rack assembly, in accordance with some embodiments.

Embodiments of the present disclosure include configurations for connecting and aggregating network data traffic of compute nodes of a computing rack assembly in a data center or a server farm. The configurations may include a plurality of computing shelves or trays with multiple sleds, with each sled containing a plurality of compute nodes. The described techniques may further include provision of optical components for computing tray-level network connectivity and aggregation for the compute nodes disposed in the sleds, and enable dynamic bandwidth allocation among the compute nodes of the various sleds of a computing shelf or tray, according to workload assigned to the compute nodes of the various sleds of the computing shelf or tray.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

FIG. 1 schematically illustrates an example computing shelf or tray 102 of a computing rack assembly 100 that may be used in a compute environment, such as a data center or a system of servers, in accordance with some embodiments. In some embodiments, multiple computing rack assemblies (hereinafter simply, rack assemblies) may be included in a compute environment. The rack assembly 100 may include one or more (e.g., a set of) computing shelves or trays, for example, computing tray 102. The computing tray 102 may include a plurality of computing sleds (hereinafter simply, sleds), such as sleds 104, 106, 108. In some embodiments, the sleds 104, 106, 108 may be removably included as part of the computing tray 102. For example, the sled 104 (or 106, 108) may comprise a board insertable into one or more sockets (not all shown) of the computing tray 102.

The computing tray 102 may further include a backplane 120 that may be mountable on a substrate (not shown) of the computing tray 102. In some embodiments, the backplane 120 may also be mountable onto a frame of the rack assembly 100 (not shown) and configured to receive the computing tray 102. At least some communicative connections pertaining to the computing tray 102 may be disposed on the backplane 120, as discussed below.

Sled 104 will now be described in greater detail. One skilled in the art will appreciate that sleds 106, 108 may include similar components as sled 104 as described below. One will also appreciate that sleds 104, 106, 108 are shown as included in the computing tray 102 for illustration purposes only. In general, two or more sleds may be disposed in a computing tray, such as computing tray 102. While not explicitly described, the sleds 106, 108 may include communicative connections and components similar to sled 104. In some embodiments, sleds 106 and 108 may include at least some dissimilar communicative connections/components.

Sled 104 may include a plurality of compute nodes (compute modules) 110 disposed in the sled. The compute nodes (e.g., compute node 110) may provide a compute, storage, or networking function, or a combination thereof, for the data center having the rack assembly 100. The compute node 110 may include at least one central processing unit (CPU), a memory, and/or other components as needed or a combination thereof. In general, the sled 104 may contain different types of compute, even over successive generations, providing for flexible compute.

The compute nodes 110 may be coupled with an optical module 112 configured to convert an electrical signal (e.g., information in a form of a data signal) provided by the compute nodes 110 into an optical signal (e.g., optically transmittable data). The compute nodes 110 and the optical module 112 may be coupled with a baseboard management controller (BMC) 114 configured to control at least some parameters (e.g., allocate connectivity and bandwidth) for the compute nodes 110 in the sled 104. In some embodiments, the BMC 114 may be implemented as software or firmware executable on a processor of a controller (e.g., associated with the compute nodes 110).

The compute nodes 110 included in the sled 104 in the computing tray 102 may be communicatively connected with one or more other components of the rack assembly 100 (e.g., a switch such as ToR switch) and/or other rack assemblies of a compute environment (e.g., a data center) by an optical network aggregation component 122 configured to carry incoming and outgoing network (e.g., Ethernet) traffic of tray 102.

The optical network aggregation component 122 providing the communication links between the components (e.g., node 110) of sled 104 and the other components of the rack assembly 100 will be now described in detail. In some embodiments, the optical network aggregation component 122 may include an optical interface 124 to enable removable inclusion of the sled 104 with the computing tray 102. The optical interface 124 may be communicatively connected with the optical module 112 of sled 104, via, e.g., a first optical cable 128. The optical interface 124 may provide board-to-board connection between the sled 104 and backplane 120 as described below.

The optical interface 124 may comprise a connecting component 130 mounted on the sled 104. The optical interface 124 may further comprise a mating component (receptacle) 132 that may be disposed in the backplane 120 (e.g., attached around the front side of the backplane 120) to receive the connecting component 130. Accordingly, sled 104 may be removably included into the computing tray 102 by plugging the connecting component 130 into the mating component 132. That is, sled 104 may be physically removable from the computing tray 102, e.g., via front access to the rack assembly 100.

The optical network aggregation component 122 may further comprise subcomponent cables (portions) 142, 144, and 146, forming a second optical cable 134, e.g., an optical pair cable. In some embodiments, the second optical cable 134 may be at least partially disposed in the backplane 120. The second optical cable 134 may be coupled with the optical interface 124 via the mating component 132. A portion 142 of the second optical cable 134 that provides optical connection with the sled 104 via the optical interface 124 may comprise multiple optical fiber pairs, the number of which may correspond to the number of optical links from the optical module 112 disposed in the sled 104. For example, if a number of outputs from the optical module 112 is four, the number of optical pairs in the portion 142 of the second optical cable 134 may also be a minimum of four.

Similarly, the second optical cable 134 may be coupled with optical interfaces 154 and 164 for the sleds 106 and 108 via portions 144 and 146 respectively. Accordingly, the second optical cable 134 may comprise multiple portions 142, 144, 146 of optical pair cables, each portion including a number of optical fiber pairs corresponding to the number of optical outputs from the optical module in the respective sled. For example, if the number of optical outputs from the optical module is four in each of the sleds 106, 108, plus the four pairs from sled 104, the second optical cable 134 may comprise 12 optical fiber pairs in total. In other words, the second optical cable 134 may aggregate the connections comprising multiple portions 142, 144, 146 for each corresponding sled 104, 106, 108. The second optical cable 134 may be coupled with an optical connector 136 to communicatively connect the computing tray 102 with the computing components of the rack assembly 100, such as a ToR switch, as indicated by arrow 140. In some embodiments, the optical connector 136 may be disposed around the front of the computing tray 102, while in other embodiments it may be disposed around the back of the computing tray 102 (not shown).

To summarize, the connectivity provided by the optical network aggregation component 122 with connector may enable independent interchangeability of the sleds 104, 106, 108 in the shelf/tray 102. Further, the use of interface 136/140 in the optical network aggregation component 122 may enable interchangeability for the entire shelf/tray 102 instead of using separate interfaces for each sled.

Figure 2:
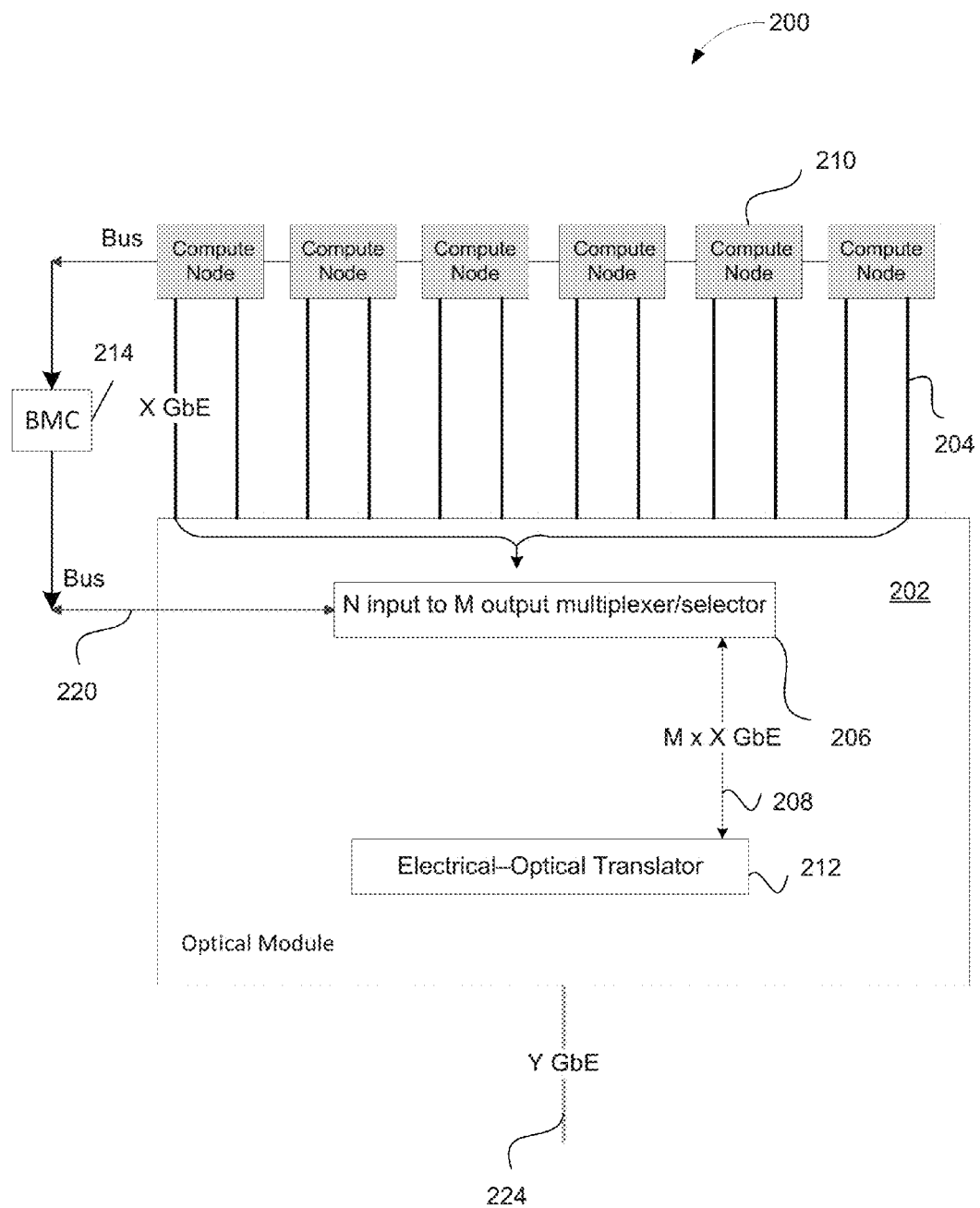
FIG. 2 is a block diagram illustrating an example configuration of some components of a sled disposed in a computing tray of a computing rack assembly, in accordance with some embodiments.

FIG. 2 is a block diagram illustrating an example configuration of some components of a sled 200 disposed in a computing tray of a rack assembly, in accordance with some embodiments. For example, the sled 200 may include an optical module 202 and baseboard management controller (BMC) 214 that may be configured to communicatively connect the compute nodes 210 of the sled 200 with other computing components of a rack assembly and to dynamically allocate communication connectivity and bandwidth between the compute nodes of the sled.

An optical module 202 may comprise a multiplexer/selector 206 with a number (e.g., N) of electrical connections 204 interfacing to compute nodes 210 that may be disposed in a sled (e.g., sled 104), each electrical connection 204 providing X gigabit per second (e.g., 10 GbE) transmission rate. The multiplexer/selector 206 may be configured to select M outputs from N inputs provided by electrical connections 204. The multiplexer/selector 206 may provide data at a transmission rate M×X GbE via connection 208 to an electrical-optical translator 212 (e.g., silicon photonics (SiPh) module). The electrical-optical translator 212 may be configured to convert electrical data inputs provided from interface 208 into optical output 224 with output of Y GbE, providing for desired network connectivity and bandwidth, which may be controlled as described below.

For example, the optical module 202 may comprise a multiplexer/selector that has N×M=12×10 GbE electrical network inputs and outputs feeding into a SiPh element that has fewer than N×M inputs (i.e., 10×10 GbE inputs) and has Y=10×10 GbE optical outputs. Accordingly, the optical module 202 may provide Ethernet/network connectivity bandwidth at the compute node side of 12×10 GbE, e.g., 120 GbE total bandwidth, of which only 10×10 GbE may be allocated dynamically at any one time.

The optical module 202 and the compute nodes 210 may be coupled with a BMC 214, e.g., via bus 220. The BMC 214 may be configured to dynamically allocate network connectivity and bandwidth between the compute nodes 210 according to workload assigned to each compute node 210. More specifically, the BMC 214 may be configured to control the configuration of the multiplexer/selector inside the optical module 202. Such dynamic connection and bandwidth allocation may be feasible based on the workload to be hosted on the compute node. An optical module configured as described in reference to FIG. 2 that provides a greater number of inputs to a number of outputs may allow BMC 214 to steer the available output bandwidth to the compute nodes executing software applications or programs that require more (network bandwidth). Conversely, less network bandwidth may be allocated to the compute nodes executing programs that require less network bandwidth. For example, BMC 214 may configure the optical module 202 to select any M of the available N inputs to provide to the electrical-optical translator 212. The BMC 214 may configure the compute nodes so their configuration matches the selection in the optical module (so that non-selected compute nodes may have one output off).

The optical module 202 configuration described above is but one example of possible implementations of the optical module. For example, in some embodiments, the optical module may comprise a conventional electrical-to-optical converter.

Figure 3:
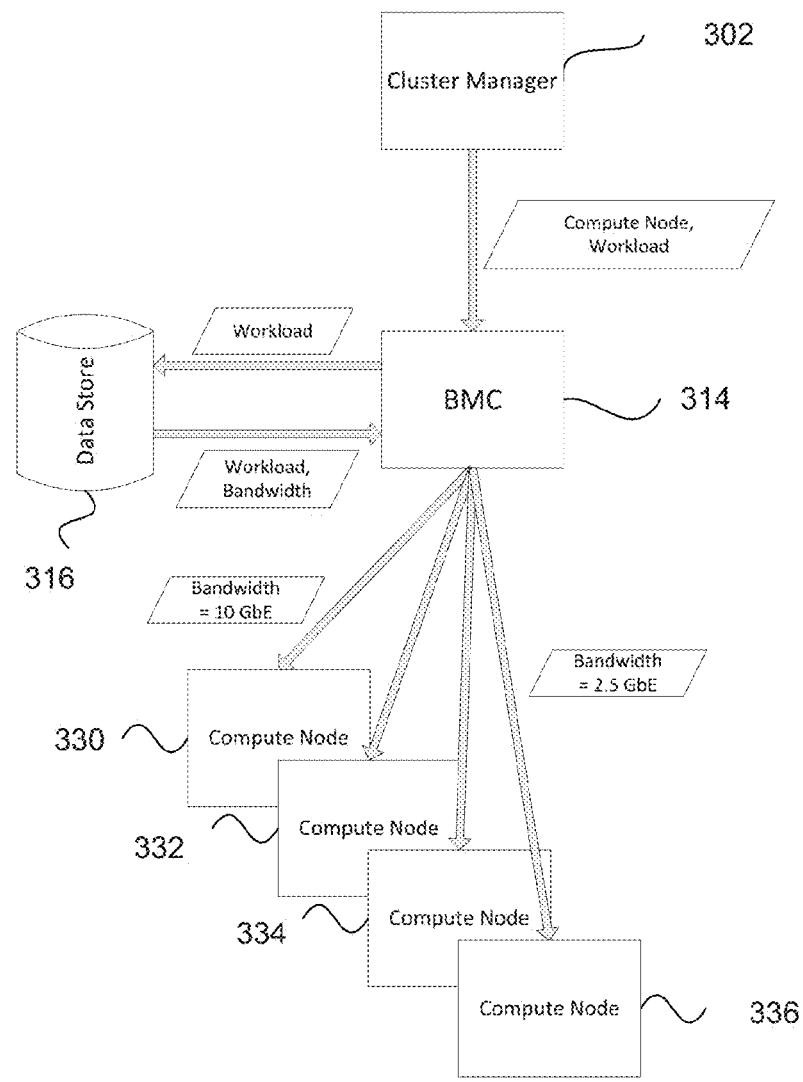
FIG. 3 is a process flow diagram for dynamic allocation of network connectivity between compute nodes in a sled according to workload assigned to each compute node, in accordance with some embodiments.

FIG. 3 illustrates a process flow diagram 300 for dynamic allocation of network connectivity and bandwidth between compute nodes in a sled of multiple sleds (e.g., 104, 106, 108) according to workload assigned to each compute node, in accordance with some embodiments.

A sled may be configured similarly to sled 104 described in reference to FIGS. 1 and 2. For example, the sled may include a plurality of (e.g., four) compute nodes 330, 332, 334, 336. At deployment of the sled, a workload assigning entity, such as cluster manager 302, may assign workload (e.g., web-serving, data-caching, or the like) to each compute node of the compute nodes 330, 332, 334, 336 in the sled. The cluster manager 302 may communicate this information to a BMC 314.

The BMC 314 may determine required network bandwidth per workload using, for example, a lookup table stored in a data store 316. The lookup table may map a particular application (workload) to a particular amount of network bandwidth. In some embodiments, the data store 316 may be associated with BMC 314. For example, the data store 316 may reside in the BMC's operating code. The data store 316 may be updated by remote agents (e.g., cluster manager 302) for times when the workload is updated and the network bandwidth requirements are changed accordingly. Based on the network bandwidth response per workload, the BMC may dynamically allocate network bandwidth to the compute nodes 330, 332, 334, 336.

Allocating network bandwidth (e.g., an upper bound on network bandwidth) per compute node may prevent the over-allocation of bandwidth as traffic is aggregated upstream from a sled. For example, web services may commonly have web-serving, front-end compute nodes coupled with a smaller number of data-caching compute nodes. As the data-caching nodes service multiple web-serving nodes, they may require a larger network bandwidth allocation than the web-serving nodes.

Assuming a deployment ratio of 3:1 web-serving to data-caching nodes, three web-serving nodes and one data-caching node per sled may be deployed, totaling four compute nodes per sled, as shown in FIG. 3. Bandwidth requirements for web-serving and data-caching may be 2.5 GbE and 10 GbE, respectively. For example, as shown in FIG. 3, the data-caching compute node 330 may be allocated 10 GbE network bandwidth while the three web-serving compute nodes 332, 334, 336 may be allocated 2.5 GbE network bandwidth.

Figure 4:
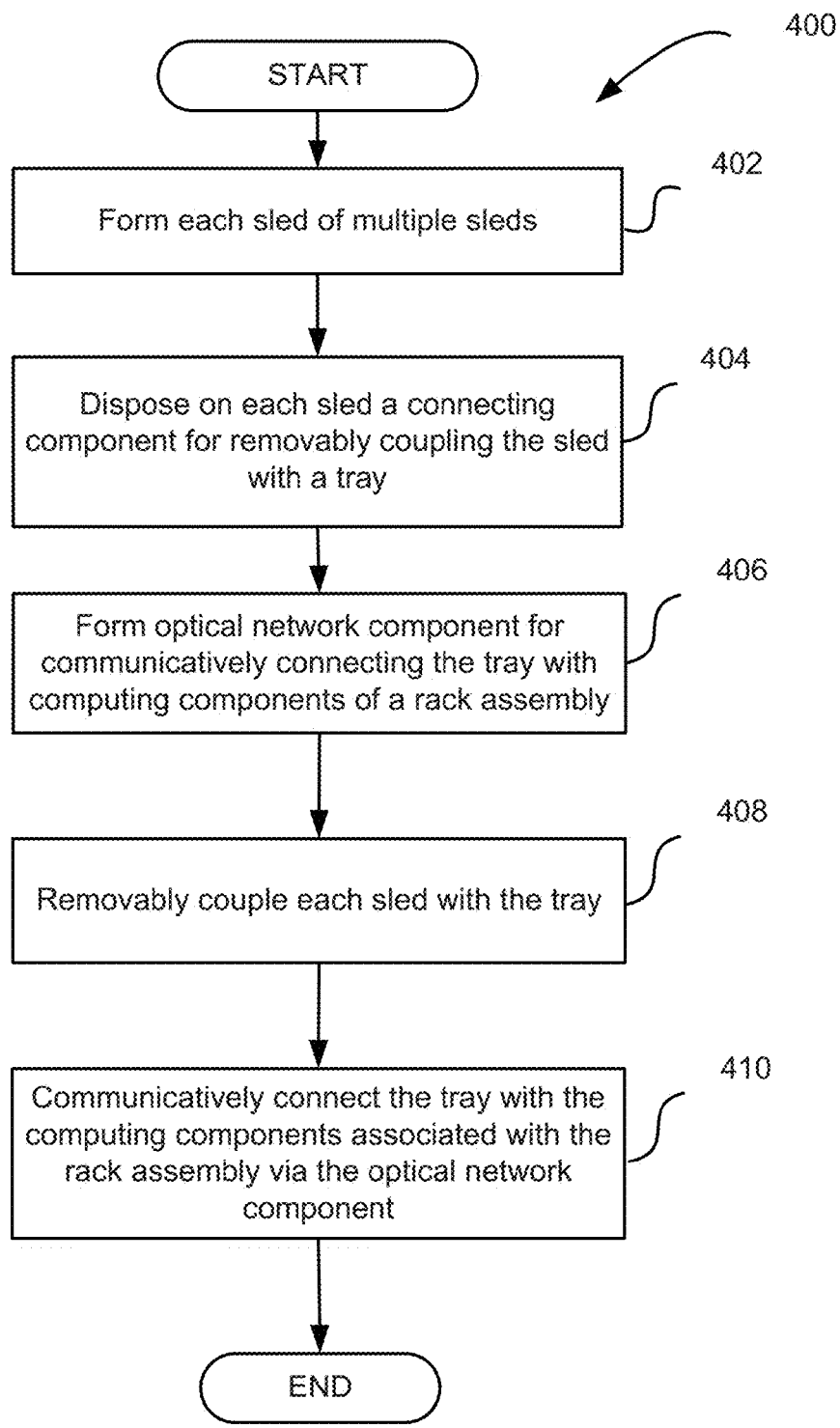
FIG. 4 is a process flow diagram illustrating an example process for providing a computing tray-level network aggregation for a computing rack assembly, in accordance with some embodiments.

FIG. 4 is a process flow diagram illustrating an example process for providing a computing tray-level network aggregation for a tray of a rack assembly, in accordance with some embodiments. The process 400 may comport with the configurations described in connection with FIGS. 1-3 in some embodiments.

At block 402, the process 400 may include forming each of the multiple sleds to be included in a computing tray, including disposing in each sled one or more compute nodes (e.g., 110), an optical module (e.g., 112) communicatively coupled with the one or more compute nodes to provide communicative connection between the compute nodes and computing components external to the sled, associated with the rack assembly, and a baseboard management controller (e.g., 114) communicatively coupled with the nodes and the optical module. The baseboard management controller may be configured to dynamically allocate network bandwidth between the compute nodes according to workload assigned to each compute node.

At block 404, the process 400 may include disposing on each sled a connecting component (e.g., 130) for removably coupling the sled with an optical interface (e.g., 124) for the purpose of aggregating network data traffic of various sleds of the computing tray. As described above, the optical interface (e.g., 124) may be formed with mating component (e.g., 132) of an optical network aggregation component (e.g., 122).

At block 406, the process 400 may further include forming the optical network component for communicatively connecting the compute nodes of the various sleds of the computing tray with one or more computing components external to the sleds, associated with a rack assembly that includes the computing tray. As noted, the optical network component may include the optical interface having the connecting component and a mating component (e.g., 132) configured to receive the connecting component (e.g., 130). The mating component may be disposed on the computing tray, for example, in a backplane of the computing tray (e.g., 120) as described in reference to FIG. 1.

Forming the optical network component may further include providing an optical cable (e.g., 134) coupled with the optical interface via the mating component and having an optical connector (e.g., 136) to communicatively connect the computing tray with the one or more computing components external to the sleds, associated with the rack assembly.

At block 408, the process 400 may include removably including each sled with the computing tray by plugging the connecting component of each sled into a corresponding mating component.

At block 410, the process 400 may include communicatively connecting the computing tray with the computing components external to the computing tray, associated with the rack assembly via the optical connector of the optical network component.

Figure 5:
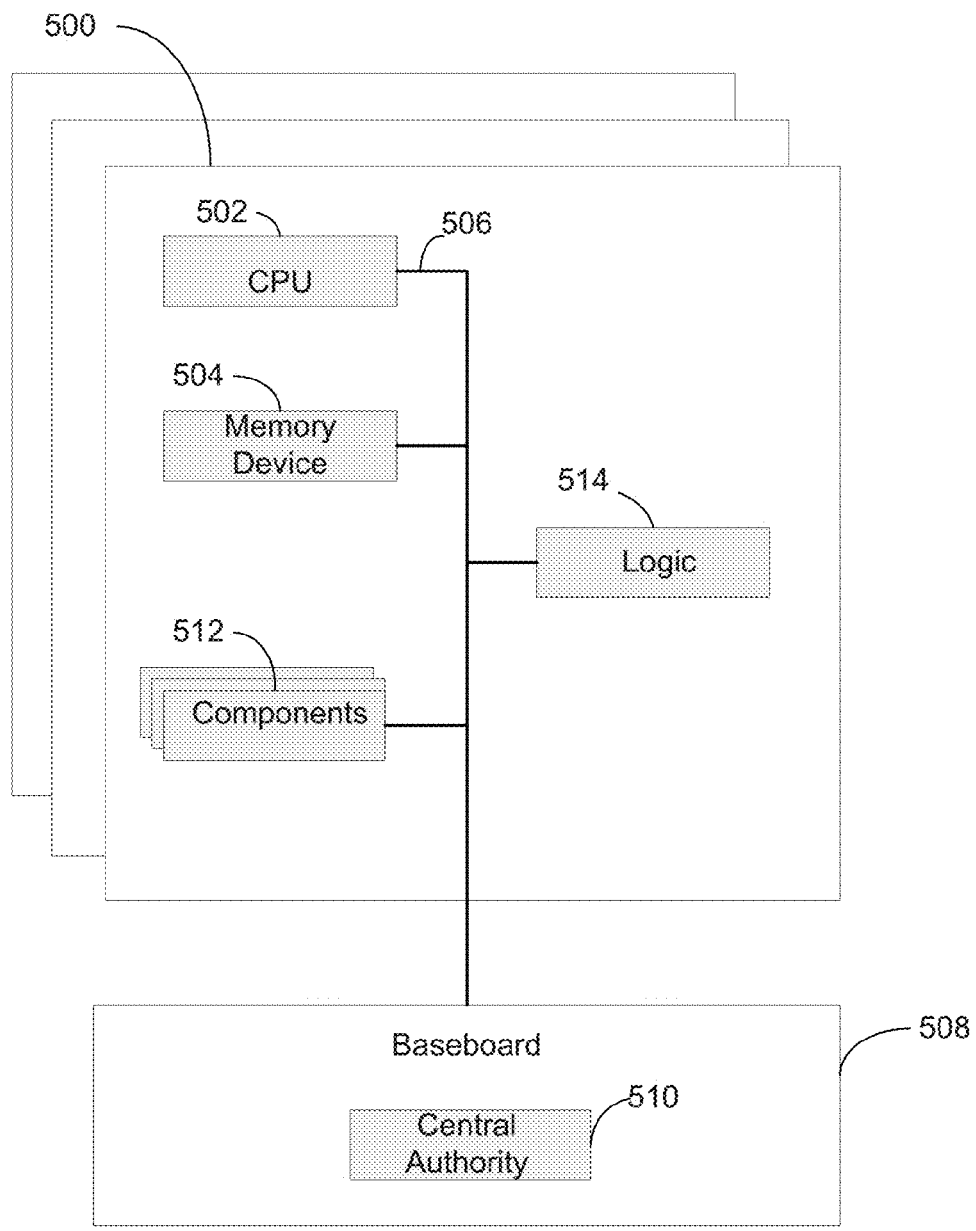
FIG. 5 is a block diagram of a computing device that may comprise one or more of the example computing trays of FIG. 1.

FIG. 5 is a block diagram of a computing device 500 that may comprise one or more of computing components, such as compute nodes 110, optical module 112, and BMC 114 of the sled 104 the rack assembly 100 of FIG. 1. The computing device 500 may be used, for example, to form various compute structures (e.g., servers) for a data center, in accordance with embodiments described in reference to FIGS. 1-4. The computing device 500 may comprise, for example, a computer, a server (e.g., blade server), data storage facility, telecommunication system, or any other electronic device that stores, processes, and communicates data.

In some examples, the computing device 500 may be any device that is capable of communicating across the multi-node system to another computing component of the system. Accordingly, in some examples, the multi-node system may be a network of nodes (modules), where each module is any device capable of communicating across the network. Additionally, in some examples, the multi-node may be a server in a rack server system. The computing device 500 may include a central authority, such as BMC coupled to a plurality of nodes and containing management firmware for the plurality of nodes in a data center or server farm.

The computing device 500 may include a host central processing unit (CPU) 502 that is configured to execute stored instructions, as well as a memory device 504 that stores instructions that are executable by the host CPU 502. The host CPU 502 may be coupled to the memory device 504 by a bus 506. Additionally, the host CPU 502 may be a single core processor, a multi-core processor, a computing cluster, or any number of other configurations. In some cases, the host CPU 502 and other components of the computing device 500 may be implemented as a system on chip (SOC). Furthermore, the computing device 500 may include more than one host CPU 502. The memory device 504 may include random access memory (RAM), read only memory (ROM), flash memory, or any other suitable memory systems. For example, the memory device 504 may include dynamic random access memory (DRAM).

The computing device 500 may be communicatively connected to a baseboard 508. The baseboard 508 may contain a central authority 510. The central authority may be used to manage each node connected to the baseboard. Additionally, the computing device 500 may include a plurality of components 512. One of the components may comprise an optical module such as optical module 112. Other components may include, for example, sensors that may be configured to collect data regarding their respective computing device. For example, sensors may collect system management information for each node. The data may include power management data, humidity control data, cooling control data, workload provisioning data, storage servicing data, I/O data, throughput data, and the like.

The computing device 500 may include logic 514. The logic 514 may enable monitoring of system management data for each compute node. For example, the logic 514 may be configured to provide dynamic allocation of bandwidth for the computing device 500, similar to the techniques described in reference to FIGS. 2 and 3. The logic 514 may communicate with the memory device 504, which may be configured to store information for dynamic allocation of bandwidth according to workload assigned to a compute node comprising computing device 500, similar to the data store 316 described in reference to FIG. 3.

System management data may be passed to the central authority 510 through the logic 514. In some cases, system management data may be gathered through several different interfaces. For example, a general purpose input/output (GPIO) interface may be used to enable access to power control, reset, and status information of the computing device 500 from the host CPU 502. A low pin count (LPC) or enhanced serial peripheral interface (eSPI) bus may be used to support various embedded controllers of the computing device 500. Additionally, a platform environment control interface (PECI) may be used to manage thermal sensors within the computing device 500. The logic 514 may obtain system management information from various interfaces and transmit this data to the central authority 510. Similarly, the central authority 510 may manage the computing device 500 by transmitting information to the logic 514. For example, the central authority 510 may include the cluster manager 302 described in reference to FIG. 3. The logic 514 may transmit the necessary information to the host CPU 502. In this manner, a standardized set of interfaces may be used to communicate with the host CPU 502.

The block diagram of FIG. 5 is not intended to indicate that the computing device 500 is to include all of the components shown in FIG. 5. Further, the computing device 500 may include any number of additional components not shown in FIG. 5, depending on the details of the specific implementation. Moreover, the computing device 500 may include fewer components than those illustrated in FIG. 5. For example, the computing device 500 may include a CPU, I/O device interface, or display interface.

The embodiments described herein may be further illustrated by the following examples. Example 1 is a computing tray to be disposed in a rack assembly, the computing tray comprising: a plurality of sleds removably included with the computing tray, wherein each sled includes a plurality of compute nodes and an optical module coupled with the plurality of compute nodes to provide communicative connection for the compute nodes with one or more computing components external to the computing tray and associated with the rack assembly; and an optical network aggregation component coupled with each optical module of the plurality of sleds via a corresponding optical interface that enables removable inclusion of the sleds with the computing tray, wherein the optical network aggregation component aggregates optical connections of the compute nodes of the sleds, provided by the optical interfaces, with the one or more computing components external to the computing tray and associated with the rack assembly.

Example 2 may include the subject matter of Example 1, and further specifies that the tray may comprise a backplane, wherein an optical interface comprises a connecting component mounted on a corresponding sled and a mating component disposed in the backplane to receive the connecting component of the corresponding sled, wherein each of the plurality of sleds is removably included with the computing tray by plugging in a connecting component of the sled into a corresponding mating component on the backplane.

Example 3 may include the subject matter of Example 2, and further specifies that the backplane is mounted on one of: the computing tray or the rack assembly.

Example 4 may include the subject matter of Example 2, and further specifies that the optical network aggregation component includes an optical cable that is at least partially disposed in the backplane and coupled with the plurality of sleds via corresponding mating components of the respective optical interfaces.

Example 5 may include the subject matter of Example 4, and further specifies that the optical cable further includes an optical connector to communicatively connect the compute nodes of the plurality of sleds of the computing tray with the one or more computing components external to the computing tray and associated with the rack assembly.

Example 6 may include the subject matter of Example 5, and further specifies that the one or more computing components external to the computing tray, associated with the rack assembly, comprise a Top-of-Rack (ToR) switch.

Example 7 may include the subject matter of Example 4, and further specifies that the optical cable comprises a plurality of optical cable pairs.

Example 8 may include the subject matter of Example 1, and further specifies that a compute node comprises at least one of: a central processing unit or a memory.

Example 9 may include the subject matter of Example 1, and further specifies that the optical module of a sled comprises an electrical to optical converter to convert information provided by the compute nodes of the sled into optically transmittable data.

Example 10 may include the subject matter of Examples 1 to 9, and further specifies that each of the plurality of sleds further includes a baseboard management controller coupled with the compute nodes of the sled to dynamically allocate network bandwidth between the compute nodes of the sled according to workload assigned to each compute node of the sled.

Example 11 is an apparatus for network aggregation, comprising: a rack assembly; and a computing tray disposed on the rack assembly, wherein the computing tray comprises: a plurality of sleds removably included with the computing tray, wherein each sled includes a plurality of compute nodes and an optical module coupled with the plurality of compute nodes to provide communicative connection for the compute nodes with one or more computing components external to the computing tray and associated with the rack assembly; and an optical network aggregation component coupled with each optical module of the plurality of sleds via a corresponding optical interface that enables removable inclusion of the sleds with the computing tray, wherein the optical network aggregation component aggregates optical connections of the compute nodes of the sleds, provided by the optical interfaces, with the one or more computing components external to the computing tray and associated with the rack assembly.

Example 12 may include the subject matter of Example 11, and further specifies that each of the multiple sleds is to be removable from the computing tray without removing the computing tray from the apparatus.

Example 13 may include the subject matter of Examples 11 to 12, and further specifies that the apparatus may further comprise a backplane, wherein the optical interface comprises a connecting component mounted on a corresponding sled and a mating component disposed in the backplane, wherein the connecting component is pluggable into the computing tray via the mating component.

Example 14 may include the subject matter of Example 13, and further specifies that the optical network aggregation component includes an optical cable that is at least partially disposed in the backplane and coupled with the optical interface via the mating component, wherein the optical cable includes an optical connector to communicatively connect the computing tray with the one or more computing components of the apparatus.

Example 15 may include the subject matter of Example 14, and further specifies that the apparatus comprises a data center, wherein the one or more computing components comprise one of a server or a switch.

Example 16 is a method for providing network aggregation of a computing tray, comprising: disposing on each of a plurality of sleds, which are to be communicatively connected with a computing tray, a connecting component for removably coupling a sled with the computing tray; forming an optical network component of the computing tray, wherein the forming includes disposing mating components on the computing tray, each mating component to receive a corresponding connecting component, and aggregating optical connections provided by optical interfaces formed by the connecting components and mating components for each sled into an optical cable for communicatively connecting the computing tray with one or more computing components external to the computing tray and associated with a rack assembly that includes the computing tray; and removably coupling each of the multiple sleds with the computing tray by plugging the connecting component of each sled into the corresponding mating component.

Example 17 may include the subject matter of Example 16, and further specifies that forming an optical network component further includes: providing the optical cable with an optical connector to communicatively connect the computing tray with the one or more computing components external to the computing tray and associated with the rack assembly.

Example 18 may include the subject matter of Example 17, and further specifies that the method may further comprise communicatively connecting the computing tray with the one or more computing components via the optical connector.

Example 19 may include the subject matter of Example 18, and further specifies that the method may further comprise forming each of the multiple sleds, including: disposing in each sled multiple compute nodes; communicatively coupling an optical module with the compute nodes of the sled, to provide communicative connection between the compute nodes of the sled and the one or more computing components; and connecting the compute nodes of the sled and the optical module with a baseboard management controller, to dynamically allocate network bandwidth between the compute nodes according to workload assigned to each compute node by at least one of the computing components associated with the rack assembly.

Example 20 may include the subject matter of Example 18, and further specifies that forming the optical network component further comprises communicatively connecting the optical module of each sled with the optical network component via a corresponding optical interface.

Example 21 is an optical network aggregation component, comprising: a plurality of optical interfaces, each optical interface is to enable removable inclusion of a corresponding sled of a plurality of sleds in a computing tray, wherein each sled includes a plurality of compute nodes and an optical module coupled with the plurality of compute nodes to provide communicative connection for the compute nodes with one or more computing components external to the computing tray, wherein the optical interface connects with each optical module; and an optical cable coupled with the plurality of optical interfaces to aggregate optical connections of the compute nodes of the sleds, provided by optical interfaces, with the one or more computing components external to the computing tray.

Example 22 may include the subject matter of Example 21, wherein each optical interface comprises a connecting component mounted on a corresponding sled and a mating component disposed in a backplane of the computing tray to receive the connecting component of the corresponding sled, wherein each of the plurality of sleds is removably included with the computing tray by plugging in a connecting component of the sled into a corresponding mating component on the backplane.

Example 23 may include the subject matter of Example 22, wherein the optical cable is at least partially disposed in the backplane and coupled with the plurality of sleds via corresponding mating components of the respective optical interfaces.

Example 24 may include the subject matter of Example 23, wherein the optical cable further includes an optical connector to communicatively connect the compute nodes of the plurality of sleds of the computing tray with the one or more computing components external to the computing tray.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A computing tray to be disposed in a rack assembly, the computing tray comprising:
a plurality of sleds removably included with the computing tray, wherein each sled includes a plurality of compute nodes and an optical module coupled with the plurality of compute nodes to provide communicative connection for the compute nodes with one or more computing components external to the computing tray and associated with the rack assembly; and
an optical network aggregation component coupled with each optical module of the plurality of sleds via a corresponding optical interface that enables removable inclusion of the sleds with the computing tray, wherein the optical network aggregation component aggregates optical connections of the compute nodes of the sleds, provided by the optical interfaces, with the one or more computing components external to the computing tray and associated with the rack assembly.

2. The computing tray of claim 1, further comprising a backplane, wherein an optical interface comprises a connecting component mounted on a corresponding sled and a mating component disposed in the backplane to receive the connecting component of the corresponding sled, wherein each of the plurality of sleds is removably included with the computing tray by plugging in a connecting component of the sled into a corresponding mating component on the backplane.

3. The computing tray of claim 2, wherein the backplane is mounted on one of: the computing tray or the rack assembly.

4. The computing tray of claim 2, wherein the optical network aggregation component includes an optical cable that is at least partially disposed in the backplane and coupled with the plurality of sleds via corresponding mating components of the respective optical interfaces.

5. The computing tray of claim 4, wherein the optical cable further includes an optical connector to communicatively connect the compute nodes of the plurality of sleds of the computing tray with the one or more computing components external to the computing tray and associated with the rack assembly.

6. The computing tray of claim 5, wherein the one or more computing components external to the computing tray, associated with the rack assembly, comprise a Top-of-Rack (ToR) switch.

7. The computing tray of claim 4, wherein the optical cable comprises a plurality of optical cable pairs.

8. The computing tray of claim 1, wherein a compute node comprises at least one of: a central processing unit or a memory.

9. The computing tray of claim 1, wherein the optical module of a sled comprises an electrical to optical converter to convert information provided by the compute nodes of the sled into optically transmittable data.

10. The computing tray of claim 1, wherein the each of the plurality of sleds further includes a baseboard management controller coupled with the compute nodes of the sled to dynamically allocate network bandwidth between the compute nodes of the sled according to workload assigned to each compute node of the sled.

11. An apparatus, comprising:
a rack assembly; and
a computing tray disposed on the rack assembly, wherein the computing tray comprises:
a plurality of sleds removably included with the computing tray, wherein each sled includes a plurality of compute nodes and an optical module coupled with the plurality of compute nodes to provide communicative connection for the compute nodes with one or more computing components external to the computing tray and associated with the rack assembly; and
an optical network aggregation component coupled with each optical module of the plurality of sleds via a corresponding optical interface that enables removable inclusion of the sleds with the computing tray, wherein the optical network aggregation component aggregates optical connections of the compute nodes of the sleds, provided by the optical interfaces, with the one or more computing components external to the computing tray and associated with the rack assembly.

12. The apparatus of claim 11, wherein each of the multiple sleds is to be removable from the computing tray without removing the computing tray from the apparatus.

13. The apparatus of claim 11, further comprising a backplane, wherein an optical interface comprises a connecting component mounted on a corresponding sled and a mating component disposed in the backplane, wherein the connecting component is pluggable into the computing tray via the mating component.

14. The apparatus of claim 13, wherein the optical network aggregation component includes an optical cable that is at least partially disposed in the backplane and coupled with the optical interface via the mating component, wherein the optical cable includes an optical connector to communicatively connect the computing tray with the one or more computing components of the apparatus.

15. The apparatus of claim 14, wherein the apparatus comprises a data center, wherein the one or more computing components comprise one of a server or a switch.

16. A method, comprising:
disposing on each of a plurality of sleds, which are to be communicatively connected with a computing tray, a connecting component for removably coupling a sled with the computing tray;
forming an optical network component of the computing tray, wherein the forming includes disposing mating components on the computing tray, each mating component to receive a corresponding connecting component, and aggregating optical connections provided by optical interfaces formed by the connecting components and mating components for each sled into an optical cable for communicatively connecting the computing tray with one or more computing components external to the computing tray and associated with a rack assembly that includes the computing tray; and
removably coupling each of the multiple sleds with the computing tray by plugging the connecting component of each sled into the corresponding mating component.

17. The method of claim 16, wherein forming an optical network component further includes: providing the optical cable with an optical connector to communicatively connect the computing tray with the one or more computing components external to the computing tray and associated with the rack assembly.

18. The method of claim 17, further comprising:
communicatively connecting the computing tray with the one or more computing components via the optical connector.

19. The method of claim 18, further comprising:
forming each of the multiple sleds, including:
disposing in each sled multiple compute nodes;
communicatively coupling an optical module with the compute nodes of the sled, to provide communicative connection between the compute nodes of the sled and the one or more computing components; and
connecting the compute nodes of the sled and the optical module with a baseboard management controller, to dynamically allocate network bandwidth between the compute nodes according to workload assigned to each compute node by at least one of the computing components associated with the rack assembly.

20. The method of claim 19, wherein forming the optical network component further comprises communicatively connecting the optical module of each sled with the optical network component via a corresponding optical interface.

21. An optical network aggregation component, comprising:
a plurality of optical interfaces, each optical interface is to enable removable inclusion of a corresponding sled of a plurality of sleds in a computing tray, wherein each sled includes a plurality of compute nodes and an optical module coupled with the plurality of compute nodes to provide communicative connection for the compute nodes with one or more computing components external to the computing tray, wherein the optical interface connects with each optical module; and
an optical cable coupled with the plurality of optical interfaces to aggregate optical connections of the compute nodes of the sleds, provided by optical interfaces, with the one or more computing components external to the computing tray.

22. The optical network aggregation component of claim 21, wherein each optical interface comprises a connecting component mounted on a corresponding sled and a mating component disposed in a backplane of the computing tray to receive the connecting component of the corresponding sled, wherein each of the plurality of sleds is removably included with the computing tray by plugging in a connecting component of the sled into a corresponding mating component on the backplane.

23. The optical network aggregation component of claim 22, wherein the optical cable is at least partially disposed in the backplane and coupled with the plurality of sleds via corresponding mating components of the respective optical interfaces.

24. The optical network aggregation component of claim 23, wherein the optical cable further includes an optical connector to communicatively connect the compute nodes of the plurality of sleds of the computing tray with the one or more computing components external to the computing tray.

* * * * *